(12) United States Patent
Hunter et al.

(10) Patent No.: US 8,355,207 B2
(45) Date of Patent: Jan. 15, 2013

(54) ANGULAR ADJUSTABLE VARIABLE BEAMSPLITTER

(75) Inventors: John H. Hunter, Almonte (CA); Ian J. Miller, Ottawa (CA)

(73) Assignee: LightMachinery Inc., Almonte, Ontario (CA)

( * ) Notice: Subject to any disclaimer, the term of this patent is extended or adjusted under 35 U.S.C. 154(b) by 63 days.

(21) Appl. No.: 13/151,431

(22) Filed: Jun. 2, 2011

(65) Prior Publication Data

US 2012/0057241 A1    Mar. 8, 2012

Related U.S. Application Data

(60) Provisional application No. 61/380,840, filed on Sep. 8, 2010.

(51) Int. Cl.
*G02B 27/14* (2006.01)
*G02B 27/10* (2006.01)

(52) U.S. Cl. ..................... 359/629; 359/618; 359/633

(58) Field of Classification Search ................. 359/618, 359/629, 633
See application file for complete search history.

(56) References Cited

U.S. PATENT DOCUMENTS

| | | | |
|---|---|---|---|
| 4,859,029 A | 8/1989 | Durrell | 359/629 |
| 5,798,867 A | 8/1998 | Uchida et al. | 359/629 |
| 5,903,393 A * | 5/1999 | Kalibjian | 359/618 |
| 6,084,717 A | 7/2000 | Wood et al. | 359/629 |
| 6,678,447 B1 | 1/2004 | Barker et al. | 385/47 |

* cited by examiner

*Primary Examiner* — William Choi
(74) *Attorney, Agent, or Firm* — Teitelbaum & MacLean; Neil Teitelbaum; Doug MacLean

(57) ABSTRACT

A beamsplitter includes a bifurcated frame, which rotates about a vertical axis, enabling the transmissive properties of an optical element, e.g. etalon, mounted on one arm of the frame, to be tuned as the angle of the optical element is rotated relative to an incoming optical beam. A mirror is mounted on the other arm of the frame intersecting light reflected from the optical element and redirecting the reflected light along a path, which is constant relative to the incoming optical beam.

14 Claims, 4 Drawing Sheets

ANGULAR ADJUSTABLE VARIABLE BEAMSPLITTER

CROSS-REFERENCE TO RELATED APPLICATIONS

The present invention claims priority from U.S. Patent Application No. 61/380,840 filed Sep. 8, 2010, which is incorporated herein by reference for all purposes.

TECHNICAL FIELD

The present invention relates to a beamsplitter, which has properties that vary with the input angle, and in particular to a rotating optical component for adjusting the incident angle on the optical component, and therefore the beamsplitting ratio, while maintaining the input and output angles constant.

BACKGROUND OF THE INVENTION

Frequently, in the optics industry, there is a need for custom beam splitters, which can split a given wavelength into sub-beams at given percentages, e.g. a 30%/70% reflective/transmissive beam splitter for 532 nm light. A custom beam splitter can cost $3,000 for a very simple flat plate beam splitter up to $12,000 for more complex cube beam splitters. Unfortunately, the conventional custom beam splitters are only designed one splitting percentage and a small range of wavelengths.

U.S. Pat. No. 6,084,717 issued Jul. 4, 2000 to Wood et al, discloses a laser beam splitter, in which plate beam splitters, designed for a specific wavelength and a specific splitting ratio, are used to divide an input beam into eight equal output beams by passing sub-beams in sequence through the plate beam splitters to obtain the desired output ratio.

Similarly, U.S. Pat. No. 5,798,867 issued Aug. 25, 1998 to Uchida et al, discloses a laser beam splitter, in which a beam splitter plate with a coating that varies along its length, is laterally adjustable to adjust the beam splitting ratio. Again, the coating is designed for a certain wavelength of input light and a certain angle of incidence.

U.S. Pat. No. 6,678,447 relates to a polarization beam splitter, which requires a plurality of modules that have to be added, rotated and removed, as varying splitting ratios are required. Furthermore the location of the output port is constantly changing as the modules are rotated and removed.

Another polarization beam splitter is disclosed in U.S. Pat. No 4,859,029 issued Aug. 22, 1989 to Durrell, requiring a high angle of incidence and polarized light.

An object of the present invention is to overcome the shortcomings of the prior art by providing a simple beam splitter that can be adjusted to give any reflectivity between about 10% and about 100% and a tranmsission that varies from about 0% to about 90% for any wavelength in the region of interest, e.g. visible, IR etc.

Another object of the present invention is to provide a variable beamsplitter in which the input and output port positions are constant for all beamsplitting ratios.

SUMMARY OF THE INVENTION

Accordingly, the present invention relates to an optical beam splitter comprising:

an input port for launching an input optical signal at a first wavelength along an input path;

a frame rotatable about a rotation axis perpendicular to the input path;

a first arm extending from the frame;

an etalon mounted on the first arm disposed in the input path at a first variable acute angle of incidence, whereby the input optical signal is split into a transmitted sub-beam, comprising a first portion of the input beam, passing through the etalon, and a reflected sub-beam, comprising a second portion of the input beam, reflected at a first variable angle of reflection from the etalon;

a second arm extending from the frame;

a mirror positioned on the second arm for receiving the reflected sub-beam at a second variable acute angle of incidence for reflecting the reflected beam at a second variable acute angle of reflection along an output path;

a first output port for receiving the transmitted sub-beam; and a second port for receiving the reflected sub-beam;

wherein rotation of the frame about the rotation axis changes the first variable acute angle of incidence, thereby enabling the first portion to be adjusted to between 0% and 90% of the input beam, and the second portion to be adjusted to between 10% and 100% of the input beam.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
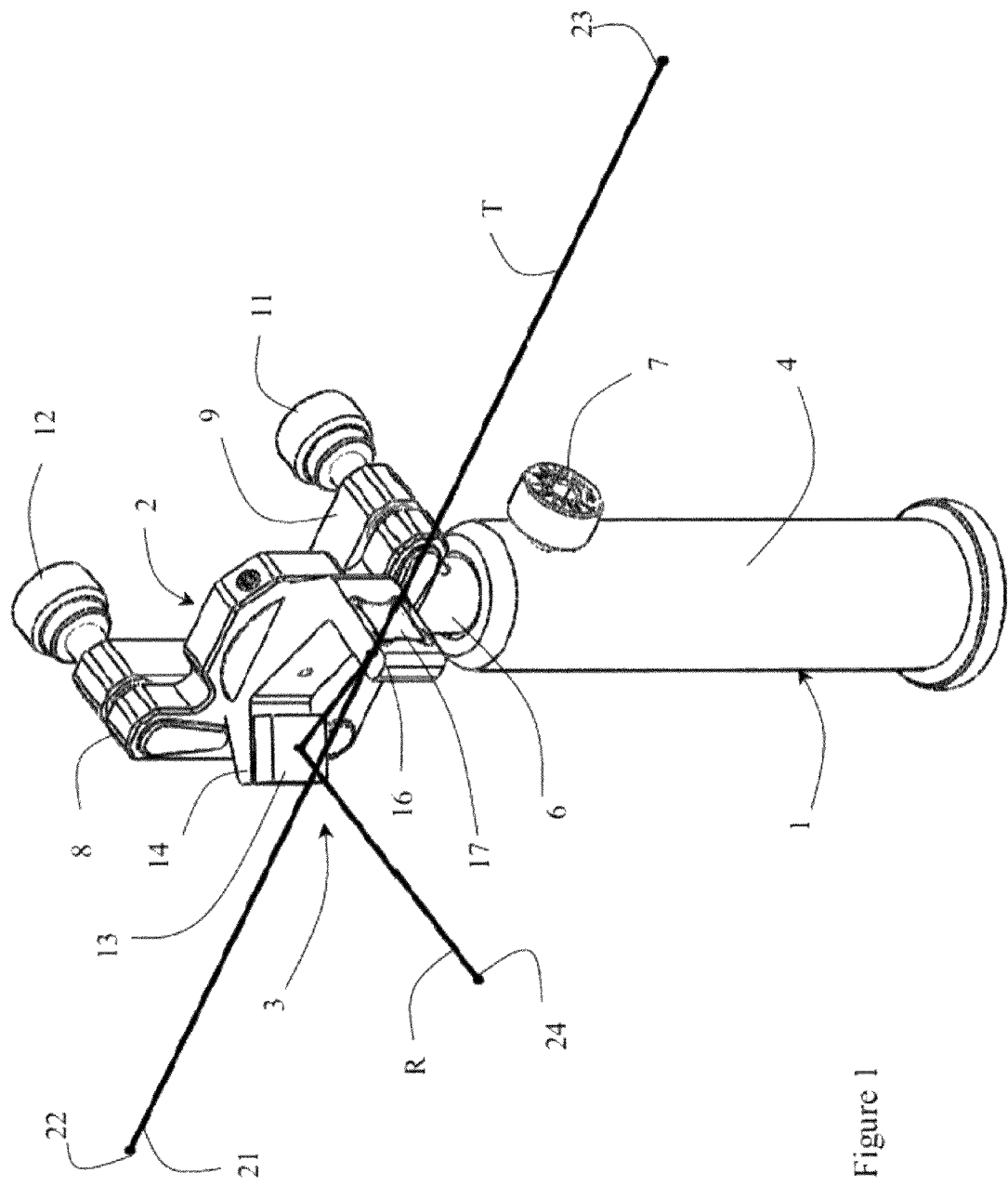
FIG. 1 is an isometric view of the beam splitter device of the present invention.
Figure 2:
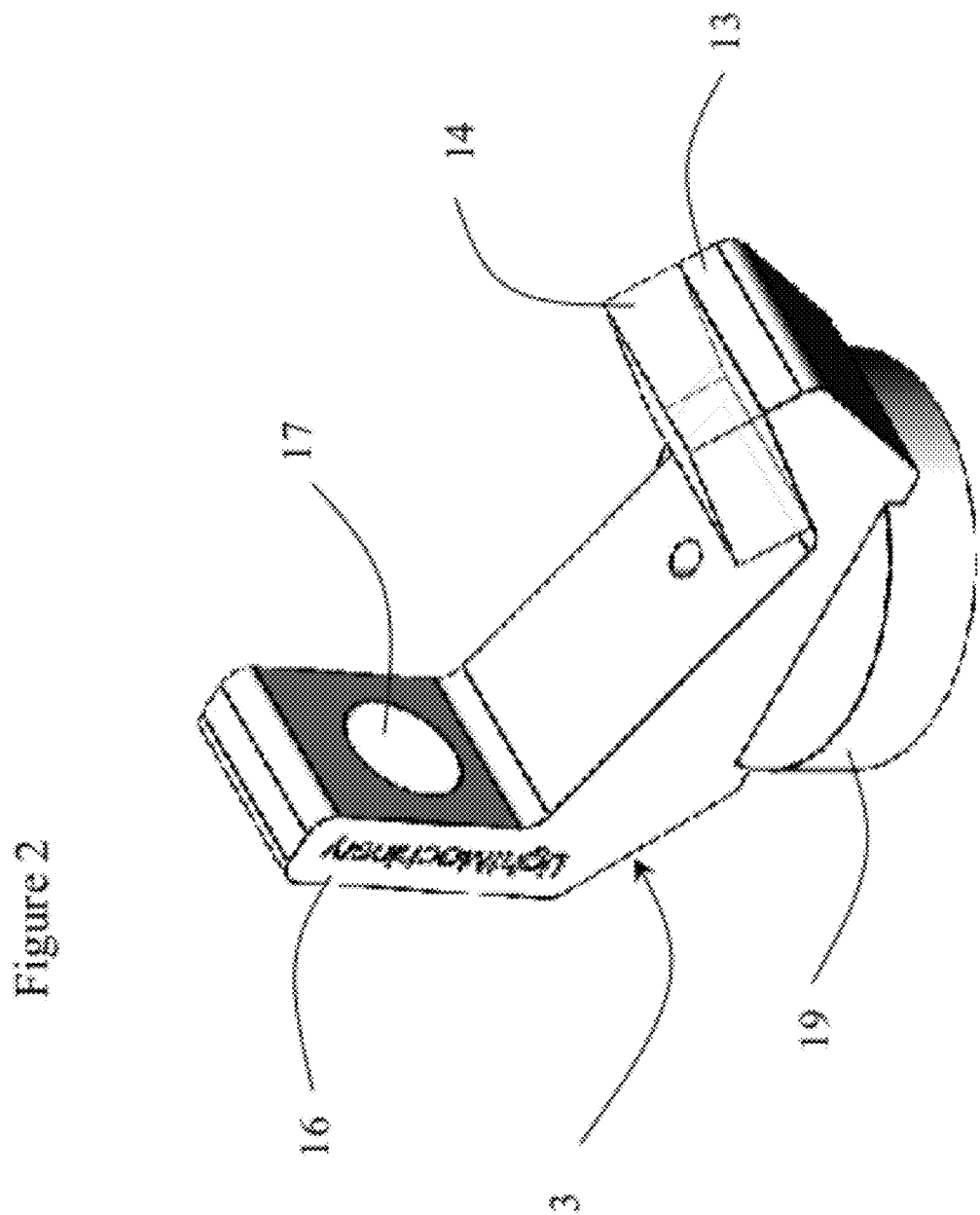
FIG. 2 is an isometric view of the dual reflector structure of the beam splitter device of FIG. 1.

With reference to FIGS. 1, 2 and 3a to 3c, the beam splitter device of the present invention includes a fixed base 1, a rotatable mount 2, and a dual reflector frame 3. The fixed base 1 includes an outer housing 4, and a rotating/sliding pedestal 6, which can be rotated and extended vertically relative to the outer housing 4. A rotating knob with a threaded rod 7 extends through the fixed base 1 for locking the pedestal 6 in any desired angular and vertical position relative to the outer housing 4. The rotatable mount 2 is fixed on the outer free end of the pedestal 6 enabling the angular and vertical position of the rotatable mount 2 and of the dual reflector frame 3, to be adjusted accordingly. Other suitable bases, which can substitute for the fixed base 2 and rotatable mount 3, are within the scope of the invention The rotatable mount 2 is comprised of a base 8, mounted on the pedestal 6, and a tilting stage 9 pivotable relative to the base 8 to provide relatively fine adjustments, e.g. 1° to 20°, preferably 1° to 10°, to the angular position of the dual reflector frame 3. A first adjusting screw 11 extending through the base 8 pivots the tilting stage 9 about a first lateral axis at one end of the rotatable mount 2. A second adjusting screw 12, extending through the base 8, pivots the tilting stage 9 about a second longitudinal axis, perpendicular to the first axis.

The dual reflector frame 3 includes a first arm 13 for supporting a mirror 14, and a second arm 16 for supporting an etalon 17. Ideally, the first arm 13, i.e. the face of etalon 17, is disposed at an angle of 45° to the second arm 16, i.e. the face of mirror 14, to ensure the reflected light beam R exits at an output port, which is in a constant position, e.g. at an angle perpendicular to the input beam; however, any acute angle is possible depending on the desired output angle and position. Typically, the mirror 14 is a standard mirror (polished) with substantially about 99% to 100% reflectivity. The etalon 17 is ideally very thin, e.g. 1 um to 1 mm thick, whereby at the thicker end of the range, e.g. 20 um to 1 mm, it can be a solid etalon, which is polished conventionally or using a fluid jet polishing technique to obtain the required thickness. The solid etalon 17 could then be coated to obtain the desired reflectivity or left uncoated for low reflectivity surfaces. For the visible and near IR wavelength ranges the solid etalon is preferably between 50 um and 400 um with an index of refraction of greater than 1.3 @ 550 nm, e.g. comprising fused silica (n=1.46), sapphire (n=1.76), ZnSe (n=2.4) or other suitable optical glasses. For the thinner range of thicknesses, e.g. 1 um to 15 um, optical coatings can be used to obtain the required thickness and reflectivities.

Typical reflectivities for the front and rear parallel faces of the etalon 17 are 3% to 36% each for uncoated materials, and 5% to 65% each for coated material at the required wavelengths. Even an uncoated etalon 17 made from optical glass, e.g. clear homogenous glass of known refractive index, provides a good response, e.g. about 15% variability. Preferably, the etalon 17 would have coatings of between 55% to 65%, and ideally 60%, on each side and will provide the reflected sub-beam R any desired percentage portion between about 10% and about 100% and the transmitted sub-beam T with any desired percentage portion from about 0% to about 90% for any wavelength in the region of interest, e.g. visible, IR etc, as the angle of incidence on the etalon 17 is adjusted.

The dual reflector frame 3 can have a custom mount to provide the rotation about the pivot axis; however, a 1" disk 19 can be mounted on the end of the frame 3, so that the frame 3 can easily be mounted in the illustrated 1" rotatable mount 2. The frame 3 can also be mounted in a motorized structure and computer controlled for more precise angular control and applications that require automation.

Figure 3:
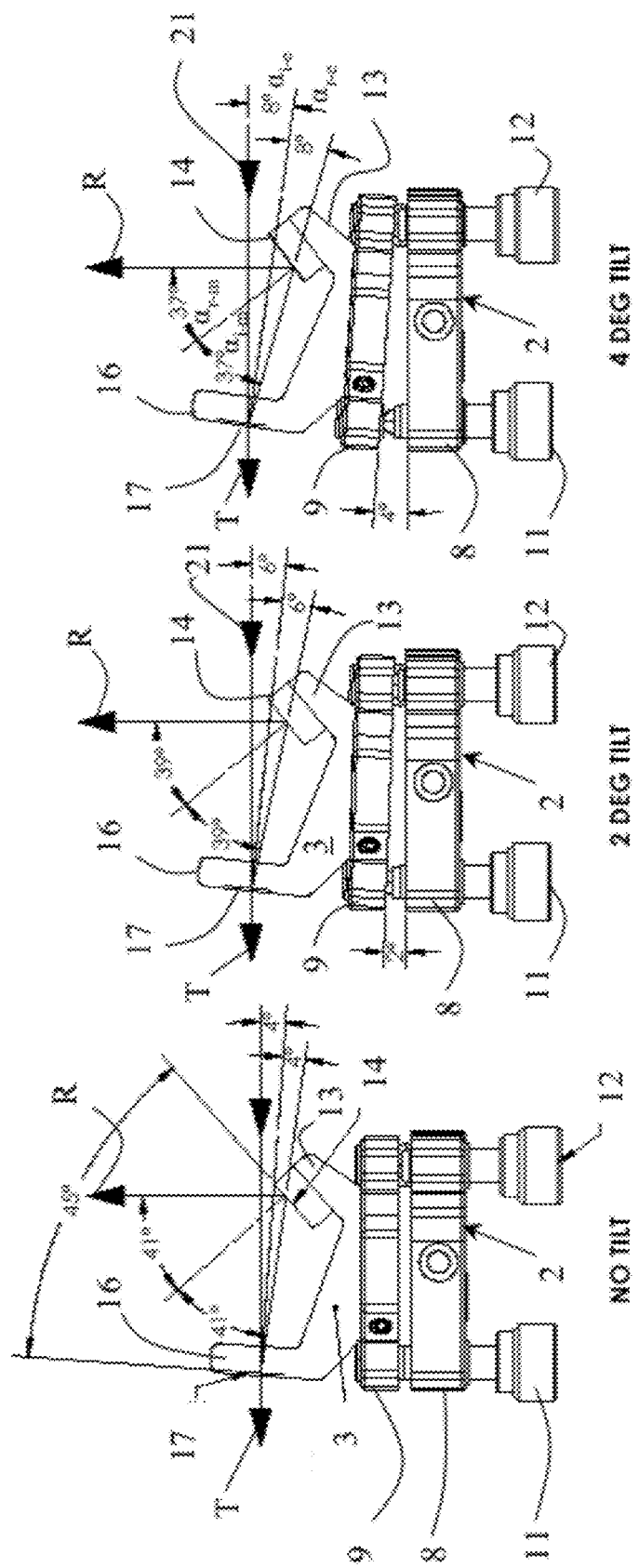
FIGS. 3a, 3b and 3c illustrate the beam splitter of FIG. 2 at various tilt angles.

With particular reference to FIGS. 3a to 3c, an incoming beam 21 at a desired wavelength or wavelength range, launched from input port 22, hits the etalon 17 at a predetermined acute angle of incidence ($\alpha_{i-e}$), e.g. 4° for FIG. 3a, 6° for FIGS. 3b and 8° for FIG. 3c, but preferably between 0° and 20°, whereby the etalon 17 reflects a first portion or percentage of the input beam 21, i.e. sub-beam R, and transmits another portion or percentage of the input beam 21, i.e. sub-beam T. The transmitted sub-beam T continues along the same path as the input beam 21 to a first output port 23, while the reflected sub-beam R is directed towards the mirror 14 at an angle of reflection ($\alpha_{r-e}$) equal to the angle of incidence ($\alpha_{i-e}$), e.g. 4°, 6° or 8° according to FIG. 3a, 3b or 3c. The first output port 23 can be a fixed structural element, e.g. with a lens etc. or simply a fixed position in which another optical element is disposed to receive the reflected sub-beam R. The mirror 14 re-directs the sub-beam R along a predetermined output path, e.g. perpendicular to the input beam 21, dependent upon the angle between the first and second arms 13 and 16 to a second output port 24. The second output port 24 can be a fixed structural element, e.g. with a lens etc. or simply a fixed position in which another optical element is disposed to receive the transmitted sub-beam T. Because the first and second arms 14 and 16, respectively, are 45° apart in the illustrated embodiment, the angle of incidence ($\alpha_{i-m}$) on the mirror 16 is 45° minus the angle of reflection ($\alpha_{r-e}$) from the etalon 17, e.g. 45°-4°=41°, which is also equal to the angle of reflection ($\alpha_{r-m}$) of the reflected sub-beam R from the mirror 14. Accordingly, the output path for the reflected sub-beam R is perpendicular to the path of the input beam 21, e.g. 41° ($\alpha_{i-m}$)+41° ($\alpha_{r-m}$)+4° ($\alpha_{i-e}$)+4° ($\alpha_{r-e}$)=90° The angle of incidence of the input beam 21 on the etalon 17 is adjusted by rotating the dual reflector frame 3 via the tilting stage 9, using the first adjusting screw 11 or other suitable means. As the dual reflector frame 3 rotates, the reflectivity of the etalon 17, at any given wavelength of the input beam 21 traveling along the input path, will vary rapidly, but the output direction of the reflected beam R always remains at a relatively constant angle, e.g. 90° to the input beam 21, because as the angle of incidence ($\alpha_{i-e}$) (and reflection ($\alpha_{r-e}$)) on the etalon 17 increase, the angle of incidence ($\alpha_{i-m}$) (and reflection ($\alpha_{r-m}$)) on the mirror 14 decreases accordingly. As seen in FIGS. 3b and 3c, if the angle of incidence ($\alpha_{i-e}$) on the etalon 17 is increased to 6° or 8°, respectively, the corresponding angles of incidence ($\alpha_{i-m}$) on the mirror 14 decrease to 39° and 37°, respectively, wherein the angle of incidence ($\alpha_{i-e}$) on the etalon 17, the angle of reflection ($\alpha_{r-e}$) on the etalon 17, the angle of incidence ($\alpha_{i-m}$) on the mirror 14 and the angle of reflection ($\alpha_{r-m}$) on the mirror 14 always adds up to 90° for every angle of incidence ($\alpha_{i-e}$) on the etalon 17, thereby ensuring that the output path is perpendicular to the input path at all angles of incidence ($\alpha_{i-e}$), and that the position of the first and second output ports 23 and 24 remain constant. The transmitted beam T has a very small parallel shift due to the thickness of the etalon 17, e.g. typically about 5 micron or less. Increasing or decreasing the angle between the first and second arms 13 and 16 would corresponding increase or decrease the angle between the input and output paths by twice as much.

Figure 4:
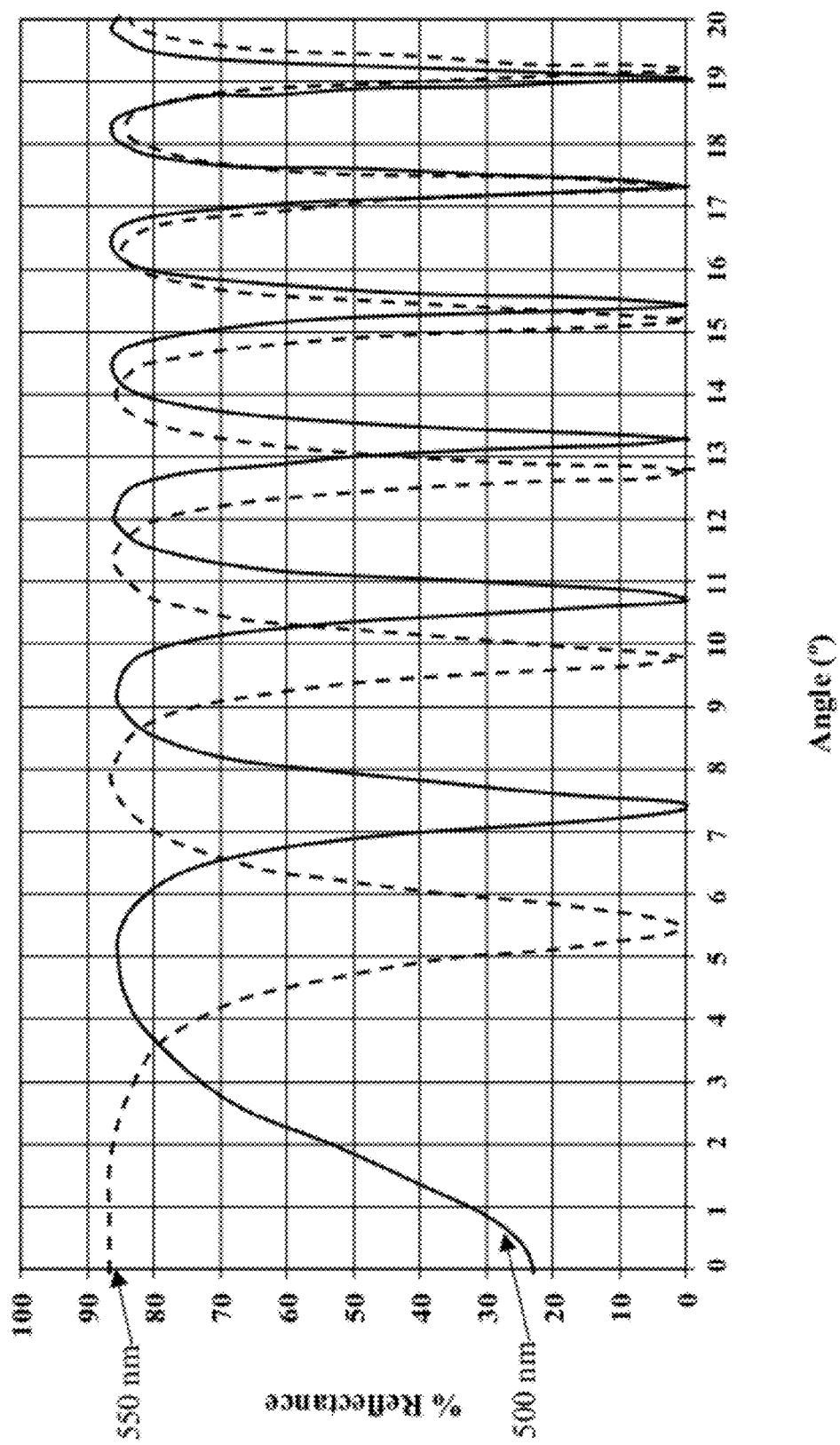
FIG. 4 is a plot of the reflectivities vs. angular position for 500 nm and 550 nm light.

As the dual reflector frame 3 is tilted about the lateral axis perpendicular to the input and output paths, to vary the angle of incidence of the input beam 21 on the etalon 17, the response of the etalon 17 shifts providing a range of reflectivity for each wavelength. FIG. 4 illustrates the transmission curves of two wavelengths, i.e. 500 nm and 550 nm, which plots transmission, 0% to 90%, versus a variety of angles 0° to 20°. The reflectivities cycle from minimum to maximum, repeating every few degrees of incident angle; however, the smaller the angle, the flatter the slope of the transmission curve, thereby providing somewhat more control at low incident angles, e.g. <6°, than the higher angles, e.g. >20°.

The reflectivity of the etalon 17 varies rapidly with wavelength; accordingly, the present invention works best for relatively narrow wavelength range sources that are collimated (lasers).

The scope of the invention can be broadened to include other optics instead of the etalon 17, e.g. any optical element with properties that vary with angle, mounted at a fixed angle to the mirror 14. Other types of coated or uncoated optical elements might also be used, waveplates, dispersion compensators, polarizers etc.

We claim:

1. An optical beam splitter comprising:
an input port for launching an input optical signal at a first wavelength along an input path;
a frame rotatable about a rotation axis perpendicular to the input path;
a first arm extending from the frame;
an etalon mounted on the first arm disposed in the input path at a first variable acute angle of incidence, whereby the input optical signal is split into a transmitted sub-beam, comprising a first portion of the input beam, passing through the etalon, and a reflected sub-beam, comprising a second portion of the input beam, reflected at a first variable angle of reflection from the etalon;
a second arm extending from the frame;

a mirror positioned on the second arm for receiving the reflected sub-beam at a second variable acute angle of incidence for reflecting the reflected beam at a second variable acute angle of reflection along an output path;

a first output port for receiving the transmitted sub-beam; and a second port for receiving the reflected sub-beam;

wherein rotation of the frame about the rotation axis changes the first variable acute angle of incidence, thereby enabling the first portion of the input beam to be adjusted to between 0% and 90% of the input beam, and the second portion of the input beam to be adjusted to between 10% and 100% of the input beam.

2. The beamsplitter according to claim 1, wherein the first arm is mounted at a fixed angle relative to the second arm, whereby the output path is fixed relative to the input path.

3. The beamsplitter according to claim 2, wherein the fixed angle is 45°, and wherein the output path is perpendicular to the input path.

4. The beamsplitter according to claim 3, wherein the first variable acute angle of incidence, the first variable angle of reflection, the second variable angle of incidence, and the second variable angle of reflection add up to 90° for each of the first variable acute angles of incidence.

5. The beamsplitter according to claim 1, wherein the frame is rotatable, whereby the first variable acute angle of incidence is variable between 0° and 20°.

6. The beamsplitter according to claim 1, further comprising a mount for supporting the frame, wherein the mount comprises a base and a tilting stage pivotable relative to the base for adjusting an angular position of the first arm, and thereby adjusting the first variable acute angle of incidence.

7. The beamsplitter according to claim 1, wherein the etalon is between 1 um and 1 mm thick.

8. The beamsplitter according to claim 1, wherein the etalon comprises a solid etalon between 20 um and 1 mm thick.

9. The beamsplitter according to claim 8, wherein the etalon comprises parallel uncoated faces, each having a reflectivity of between 3% to 36%.

10. The beamsplitter according to claim 8, wherein the etalon comprises parallel coated faces, each having a reflectivity of between and 5% to 65%.

11. The beamsplitter according to claim 8, wherein the etalon comprises parallel coated faces, each having a reflectivity of between and 55% to 65%.

12. The beamsplitter according to claim 1, wherein the etalon comprises a solid etalon between 50 um and 400 um thick with an index of refraction of greater than 1.3 @ 550 nm.

13. The beamsplitter according to claim 12, wherein the etalon is comprised of a material selected from the group consisting of fused silica, sapphire, ZnSe, and suitable optical glass.

14. The beamsplitter according to claim 1, wherein the mirror has a reflectivity of substantially about 99% to 100%.

* * * * *